(12) United States Patent
R et al.

(10) Patent No.: US 7,044,644 B2
(45) Date of Patent: *May 16, 2006

(54) ELECTRICALLY CONDUCTING CERAMIC BEARINGS

(75) Inventors: Jayaprakash R, Karnataka (IN); George Parampil, Karnataka (IN)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 68 days.

This patent is subject to a terminal disclaimer.

(21) Appl. No.: 10/630,284

(22) Filed: Jul. 30, 2003

(65) Prior Publication Data

US 2004/0240763 A1 Dec. 2, 2004

Related U.S. Application Data

(63) Continuation-in-part of application No. 10/445,590, filed on May 27, 2003.

(51) Int. Cl.
*F16C 19/08* (2006.01)

(52) U.S. Cl. .................... 384/492; 384/907.1; 384/913

(58) Field of Classification Search ............... 378/121; 384/492, 907, 907.1, 913
See application file for complete search history.

(56) References Cited

U.S. PATENT DOCUMENTS

| 4,792,244 | A | 12/1988 | Yamashita et al. |
| 4,997,296 | A | 3/1991 | Narita et al. |
| 6,158,894 | A | 12/2000 | Pujari et al. |
| 6,315,454 | B1 | 11/2001 | Niwa |
| 6,505,974 | B1 | 1/2003 | Giesler et al. |
| 6,508,591 | B1 | 1/2003 | Niwa et al. |
| 6,702,466 | B1 * | 3/2004 | Ishikawa et al. ............ 384/112 |
| 6,874,942 | B1 * | 4/2005 | Yamamoto et al. ......... 384/492 |

* cited by examiner

*Primary Examiner*—Lenard A. Footland
(74) *Attorney, Agent, or Firm*—Dougherty Clements; Christopher L. Bernard; Peter J. Vogel

(57) ABSTRACT

Electrically conducting ceramic bearings are described. All components of these bearings preferably comprise TSC, and may not require any conductive coating, or any lubricating coating. These bearings may comprise at least one rolling element such as a bearing ball, a roller, a needle, or the like. These bearings may be ideal for use in x-ray tube bearing assemblies in x-ray imaging systems, or in any other systems that require electrically conductive bearings.

10 Claims, 2 Drawing Sheets

ELECTRICALLY CONDUCTING CERAMIC BEARINGS

CROSS REFERENCE TO RELATED APPLICATIONS

This invention is a continuation-in-part of commonly-owned, U.S. patent application Ser. No. 10/445,590, entitled "Electrically Conducting Ceramic Bearing Rolling Elements," filed on May 27, 2003, which is hereby incorporated in full by reference.

FIELD OF THE INVENTION

The present invention relates generally to bearings comprising rolling elements. More specifically, the present invention relates to electrically conducting bearings and, more specifically, to such bearings comprising $Ti_3SiC_2$.

BACKGROUND OF THE INVENTION

Filament life and bearing life are two important factors that limit the life of an x-ray tube. Therefore, x-ray tube bearing life is critical to high performance x-ray tube operation. In an x-ray tube, the primary electron beam generated by the cathode deposits a very large heat load in the anode target to the extent that the target glows red-hot in operation. Typically, less than 1% of the primary electron beam energy is converted into x-rays, while the balance is converted to thermal energy. This thermal energy from the hot target is conducted and radiated to other components within the vacuum vessel of the x-ray tube. As a result of these high temperatures caused by this thermal energy, the x-ray tube components are subjected to high thermal stresses that are problematic in the operation and reliability of the x-ray tube.

Typically, an x-ray beam generating device, referred to as an x-ray tube, comprises opposed electrodes enclosed within a cylindrical vacuum vessel. The vacuum vessel is typically fabricated from glass or metal, such as stainless steel, copper or a copper alloy. As mentioned above, the electrodes comprise the cathode assembly that is positioned at some distance from the target track of the rotating, disc-shaped anode assembly. Alternatively, such as in industrial applications, the anode may be stationary. The target track, or impact zone, of the anode is generally fabricated from a refractory metal with a high atomic number, such as tungsten or tungsten alloy. Further, to accelerate the electrons, a typical voltage difference of 60 kV to 140 kV is maintained between the cathode and anode assemblies. The hot cathode filament emits thermal electrons that are accelerated across the potential difference, impacting the target zone of the anode at high velocity. A small fraction of the kinetic energy of the electrons is converted to high energy electromagnetic radiation, or x-rays, while the balance is contained in back scattered electrons or converted to heat. The x-rays are emitted in all directions, emanating from the focal spot, and may be directed out of the vacuum vessel along a focal spot alignment path. In an x-ray tube having a metal vacuum vessel, for example, an x-ray transmissive window is fabricated into the metal vacuum vessel to allow the x-ray beam to exit at a desired location. After exiting the vacuum vessel, the x-rays are directed along the focal spot alignment path to penetrate an object, such as human anatomical parts for medical examination and diagnostic procedures. The x-rays transmitted through the object are intercepted by a detector or film, and an image is formed of the internal anatomy therein. Further, industrial x-ray tubes may be used, for example, to inspect metal parts for cracks, or to inspect the contents of luggage at airports.

Since the production of x-rays in a medical diagnostic x-ray tube is by its nature a very inefficient process, the components in x-ray generating devices operate at elevated temperatures. For example, the temperature of the anode focal spot can run as high as about 2700° C., while the temperature in the other parts of the anode may range up to about 1800° C. Additionally, the components of the x-ray tube must be able to withstand the high temperature exhaust processing of the x-ray tube, at temperatures that may approach approximately 450° C. for a relatively long duration. The thermal energy generated during tube operation is typically transferred from the anode, and other components, to the vacuum vessel.

The high operating temperature of an x-ray tube is problematic for a number of reasons. The exposure of the components of the x-ray tube to cyclic, high temperatures can decrease the life and reliability of the components. In particular, the anode assembly is typically rotatably supported by a bearing assembly. This bearing assembly is very sensitive to high heat loads. Overheating the bearing assembly can lead to increased friction, increased noise, and to the ultimate failure of the bearing assembly.

The choice of materials for such bearing assemblies in x-ray tubes is currently somewhat restrained because the rolling elements and the bearing itself must be electrically conducting in order to ensure electrical conductivity through the bearing to the cathode and anode assemblies. As a result, tool steel coated with a solid lubricant, such as lead, or more often, silver, is generally used in such bearings. However, the coating process is an expensive process, and the solid silver lubricant is thermally sensitive, generally requiring that bearings using such materials be operated at temperatures below 450° C. Additionally, traditional silver coated metal rolling elements generally deform substantially during operation, thereby resulting in noise and early failure of the bearing when operated at high temperatures for prolonged periods of time. Furthermore, silver also tends to react with the bearing steel if it becomes too hot, causing grain boundary cracking and premature failure of the bearing. Therefore, it would be desirable to be able to use materials in such bearings that did not have all the drawbacks of the current materials.

Electrically conducting bearings, made entirely of ceramic, would be ideal for such applications. However, no suitable electrically conducting ceramic bearings presently exist for such purposes. Thus, there is a need for such suitable electrically conducting ceramic bearings. Such ceramic bearings would ideally comprise $Ti_3SiC_2$ (also called TSC) instead of the steels or ceramics that are now commonly used (i.e., T5, T15, Rex20, SiN, $Al_2O_3$, SiC, zirconia, etc.). Such ceramic bearings would ideally not require the use of additional lubricant as many existing bearings do, thereby eliminating the expensive coating process that is currently required in some bearing assemblies. Additionally, such ceramic bearings would ideally allow faster rotation speeds and higher operating temperatures to be sustained than currently possible with existing bearings. Furthermore, the ceramic rolling elements in such ceramic bearings would ideally exhibit less deformation during operation than current silver coated steel rolling elements, and would ideally allow for quieter and smoother operation than currently possible. Moreover, such ceramic bearings would ideally lead to longer bearing life than currently possible with existing bearings. Many other needs will also be met by this invention, as will become more apparent throughout the remainder of the disclosure that follows.

SUMMARY OF THE INVENTION

Accordingly, the above-identified shortcomings of existing systems and methods are overcome by embodiments of the present invention, which relates to electrically conducting ceramic bearings. Embodiments of this invention comprise electrically conducting ceramic bearings comprising TSC instead of the steels and/or ceramics that are now commonly used (i.e., instead of T5, T15 and/or Rex20, SiN, $Al_2O_3$, SiC, zirconia, etc). These ceramic bearings may not require the use of additional lubricant as many existing bearings do, thereby eliminating the expensive coating process that is currently required in some bearing assemblies. Additionally, these ceramic bearings may allow faster rotation speeds and higher operating temperatures to be sustained than currently possible with existing bearings. Furthermore, the ceramic rolling elements in these bearings may exhibit less deformation during operation than current silver coated steel rolling elements, and may allow for quieter and smoother operation than currently possible. Moreover, these ceramic bearings may lead to longer bearing life than currently possible with existing bearings.

Embodiments of this invention comprise electrically conducting ceramic bearings. The components in these bearings preferably comprise TSC, and may comprise a rolling element such as a bearing ball, a roller, and/or a needle, or any other suitable rolling element therein. The rolling element may have no coating on it at all, or it may have a conductive coating or even a non-conductive coating on it.

Embodiments of this invention also comprise an electrically conducting rolling element bearing assembly. In some embodiments of this invention, the bearing assembly may comprise an electrically conducting inner race; an electrically conducting outer race; and a plurality of electrically conducting bearing rolling elements rotatably positioned between the electrically conducting inner race and the electrically conducting outer race, wherein the electrically conducting inner race, the electrically conducting outer race and each electrically conducting bearing rolling element comprises TSC. In other embodiments of this invention, the bearing assembly may comprise an electrically conducting bearing rolling element support member comprising race means therein; and a plurality of electrically conducting ceramic bearing rolling elements rotatably positioned within the race means of the electrically conducting bearing rolling element support member, wherein the electrically conducting bearing rolling element support member and each electrically conducting ceramic bearing rolling element comprise TSC.

Embodiments of this invention also comprise an x-ray tube for generating and directing x-rays toward a target along a focal spot alignment path. The x-ray tube may comprise a cathode operatively positioned within the x-ray tube to generate electrons; an anode assembly operatively positioned relative to the cathode to generate x-rays when struck by the electrons; and a bearing assembly capable of supporting rotation of the anode assembly relative to the cathode, wherein the bearing assembly comprises an electrically conducting ceramic bearing comprising TSC.

Finally, embodiments of this invention also comprise an x-ray imaging system. The x-ray imaging system may comprise an x-ray tube for generating and directing x-rays toward a target along a focal spot alignment path. The x-ray tube may comprise a cathode operatively positioned within the x-ray tube to generate electrons; an anode assembly operatively positioned relative to the cathode to generate x-rays when struck by the electrons; and a bearing assembly capable of supporting rotation of the anode assembly relative to the cathode, wherein the bearing assembly comprises an electrically conducting ceramic bearing comprising TSC.

Further features, aspects and advantages of the present invention will be more readily apparent to those skilled in the art during the course of the following description, wherein references are made to the accompanying figures which illustrate some preferred forms of the present invention, and wherein like characters of reference designate like parts throughout the drawings.

DESCRIPTION OF THE DRAWINGS

The systems of the present invention are described herein below with reference to various figures, in which.

DETAILED DESCRIPTION OF THE INVENTION

Figure 1:
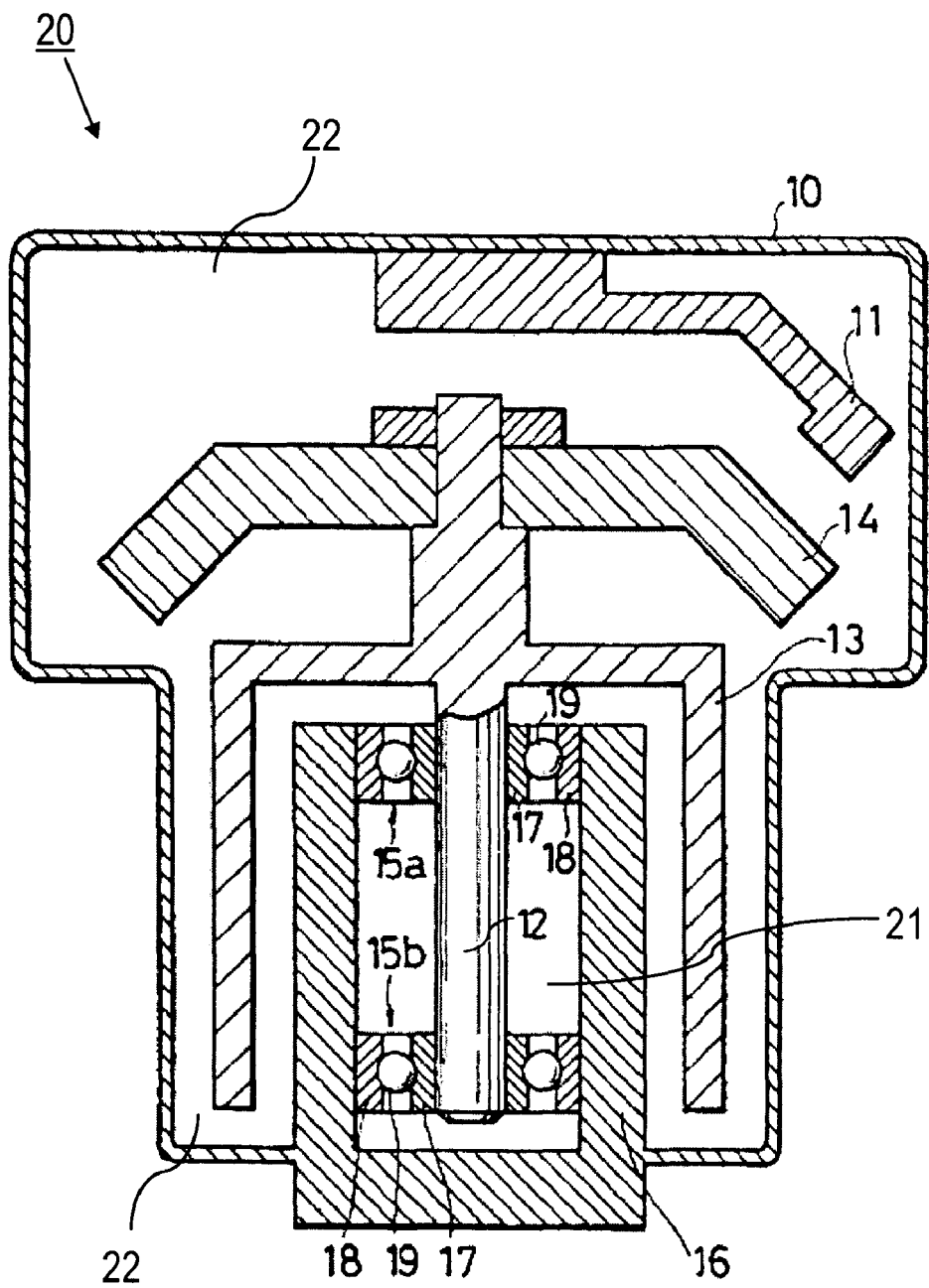
FIG. 1 is a schematic diagram showing an x-ray tube comprising an embodiment of the electrically conducting ceramic bearings of this invention.
Figure 2:
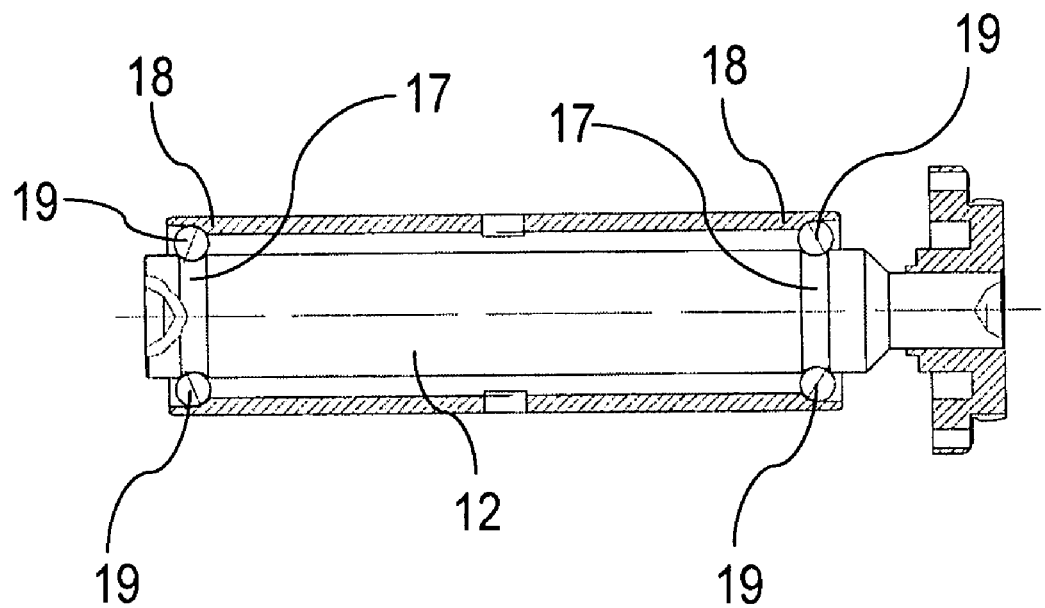
FIG. 2 is a schematic diagram showing another embodiment of an x-ray tube comprising an embodiment of the electrically conducting ceramic bearings of this invention.

For the purposes of promoting an understanding of the invention, reference will now be made to some preferred embodiments of the present invention as illustrated in FIGS. 1–2 and specific language used to describe the same. The terminology used herein is for the purpose of description, not limitation. Specific structural and functional details disclosed herein are not to be interpreted as limiting, but merely as a basis for the claims as a representative basis for teaching one skilled in the art to variously employ the present invention. Any modifications or variations in the depicted support structures and methods of making same, and such further applications of the principles of the invention as illustrated herein, as would normally occur to one skilled in the art, are considered to be within the spirit of this invention.

An x-ray tube comprising one exemplary embodiment of the electrically conducting ceramic bearings of the present invention is shown in FIG. 1. X-ray imaging systems generally comprise an x-ray tube 20 that comprises: a vacuum envelope 10; an anode assembly including a rotor 13, a rotary shaft 12 fixed to the rotor, and a stator 16; a cathode 11 for emitting electrons; an anode target 14 fixed to the rotary shaft 12 for generating and directing x-rays along a focal spot alignment path; and a bearing structure 15a, 15b that provides axial and radial support to the rotating anode 14 during operation, all operatively positioned within the vacuum envelope 10. In this embodiment, rotary shaft 12 is rotatably supported by stator 16 through two ball bearing assemblies 15a, 15b. Each of the ball bearing assemblies 15a, 15b comprises an inner race 17, an outer race 18, and a plurality of bearing balls 19 rotatably positioned between inner race 17 and outer race 18. A magnetic field generator is disposed outside vacuum envelope 10 to generate a rotating magnetic field that rotates the rotary shaft 12, rotor 13, and anode target 14 at high speed during operation.

There is a vacuum inside the vacuum envelope 10 of about $10^{-5}$ to about $10^{-9}$ torr. When electrons emitted from the cathode 11 hit the anode target 14, x-rays are generated, which heats up the anode target 14 and the inside of vacuum envelope 10. When the anode target 14 and the vacuum envelope 10 are heated to high temperatures, the bearing assemblies 15a, 15b are also heated due to heat transfer (both radiant and conductive) from rotary shaft 12. To prevent the bearing assemblies 15a, 15b from seizing up and wearing due to the heat, the frictional surfaces of the bearing rolling elements 19 are generally coated with some sort of lubricant. Additionally, often times even the frictional surfaces of the inner race 17 and outer race 18 are coated with a lubricant too. As previously discussed, since these bearing assemblies 15a, 15b are utilized under vacuum at high temperatures, solid metal lubricants, such as silver or lead, are generally the only suitable lubricants. However, neither the silver nor the lead is an ideal lubricant for such applications. Lead cannot be optimally used in such applications because, since it has a low melting point and high evaporation rate, a high vacuum may not be able to be maintained in the x-ray tube. Silver also is not ideal because, since silver is much harder than lead, the noise generated by silver lubricated bearing assemblies is greater, and the service life of silver lubricated bearing assemblies may be shorter. Furthermore, silver has several other drawbacks. Silver tends to react with the bearing steel if it becomes too hot, causing grain boundary cracking and premature failing of the bearing. Silver also requires more starting and running torque than lead due to its lower lubricity.

Therefore, it is clear that such solid metal coatings on steel rolling elements do not adequately dampen the chattering noise of the rolling element bearings, and are not durable when used at continuously high speeds and temperatures. While ceramic bearing components are currently being used in some bearings, most such ceramic bearing components are electrically non-conducting, and therefore require a conductive coating of some sort. It would be more desirable to use electrically conducting ceramic bearing components in such bearings. Many existing systems may even be retrofitted with some of the electrically conducting ceramic bearing components of this invention (i.e., the electrically conducting ceramic rolling elements 19), without requiring any design changes.

The components of the ceramic bearing assemblies 15a, 15b of this invention (i.e., inner race 17, outer race 18, and rolling elements 19) preferably all comprise $Ti_3SiC_2$ (also called TSC). TSC is a grade of ceramic that is electrically conducting. TSC bearing components are stronger and harder (>65 HRC) than steel bearing components, so there is less deformation in the ceramic bearing rolling elements than in the steel bearing rolling elements, and thereby less noise and vibration in bearing assemblies using the ceramic bearing components of this invention. TSC also has better thermal properties than steel, as shown in the table below.

| Properties | T5 Steel | TSC Ceramic |
|---|---|---|
| Electrical Conductivity (milliohm * meter) | 0.2–0.5 | 0.22–0.35 |
| Thermal Conductivity (W/mK) | 24.3 | 37 |
| Hardness (HRc) | >62 | 40–100 |
| Youngs Modulus (GPa) | 207 | 325 |
| Shear Modulus (GPa) | 80.23 | 134 |
| Thermal Expansion Coefficient (1/° C.) | 11.07 | $9.2 * 10^{-6}$ |

There are many advantages to making these electrically conducting ceramic bearing assemblies 15a, 15b (i.e., inner race 17, outer race 18, and rolling elements 19) out of TSC. Since the TSC has greater hardness, greater wear resistance, and greater stiffness than the steel normally used in such bearing components, the TSC bearing rolling elements produce less noise during bearing operation than steel bearing rolling elements produce. Since TSC bearing components are harder than steel bearing components, TSC bearings generally have a longer expected life, enhanced performance and increased durability over many existing steel-containing bearings. Because the TSC bearing components are electrically conducting, no additional conductive coating is needed. Bearings comprising TSC bearing components can work at faster rotation speeds (possibly up to about 50000 rpm) and higher operating temperatures (possibly up to about 1000° C.) than currently possible with existing bearings. Furthermore, the TSC bearing rolling elements may be able to directly replace the steel bearing rolling elements in existing rolling element bearing assemblies, without requiring any design changes. Finally, by varying the composition of the TSC bearing components, the TSC bearing components may be able to be made self-lubricating, without substantially altering the other required properties. Many other advantages will also be apparent to those skilled in the relevant art.

As described above, the electrically conducting ceramic bearings of this invention allow high performance bearings to be realized. Advantageously, the bearing rolling elements in many types of rolling element bearing assemblies requiring electrically conducting bearing rolling elements can be easily replaced with the electrically conducting ceramic bearing rolling elements of this invention without requiring any further modifications.

Various embodiments of this invention have been described in fulfillment of the various needs that the invention meets. It should be recognized that these embodiments are merely illustrative of the principles of various embodiments of the present invention. Numerous modifications and adaptations thereof will be apparent to those skilled in the art without departing from the spirit and scope of the present invention. For example, while using these electrically conducting ceramic bearings in x-ray imaging systems has been described, these bearings could be used in a variety of other systems for use in various applications. Additionally, while bearing balls have been described in one embodiment of this invention, the rolling elements of this invention could also comprise any other suitable rolling element, such as, for example, a roller or a needle or the like. Thus, it is intended that the present invention cover all suitable modifications and variations as come within the scope of the appended claims and their equivalents.

What is claimed is:

1. An electrically conducting rolling element bearing assembly comprising:
   an electrically conducting inner race;
   an electrically conducting outer race; and
   a plurality of electrically conducting bearing rolling elements rotatably positioned between the electrically conducting inner race and the electrically conducting outer race,
   wherein the electrically conducting inner race, the electrically conducting outer race and each electrically conducting bearing rolling element comprise TSC, and
   wherein each electrically conducting bearing rolling element further comprises at least one of:
   (a) a conductive coating thereon; and
   (b) a non-conductive coating thereon.

2. The electrically conducting rolling element bearing assembly of claim 1, wherein each electrically conducting bearing rolling element comprises at least one of: a bearing ball, a roller, and a needle.

3. An electrically conducting rolling element bearing assembly comprising:
   an electrically conducting bearing rolling element support member comprising race means therein; and
   a plurality of electrically conducting ceramic bearing rolling elements rotatably positioned within the race means of the electrically conducting bearing rolling element support member,
   wherein the electrically conducting bearing rolling element support member and each electrically conducting ceramic bearing rolling element comprise TSC, and
   wherein each electrically conducting ceramic bearing rolling element further comprises at least one of:
   (a) a conductive coating thereon; and
   (b) a non-conductive coating thereon.

4. The electrically conducting rolling element bearing assembly of claim 3, wherein each electrically conducting ceramic bearing rolling element comprises at least one of: a bearing ball, a roller, and a needle.

5. An x-ray tube for generating and directing x-rays toward a target along a focal spot alignment path, the x-ray tube comprising:
   a cathode operatively positioned within the x-ray tube to generate electrons;
   an anode assembly operatively positioned relative to the cathode to generate x-rays when struck by the electrons; and
   a bearing assembly capable of supporting rotation of the anode assembly relative to the cathode,
   wherein the bearing assembly comprises an electrically conducting ceramic bearing comprising TSC.

6. The x-ray tube of claim 5, wherein the electrically conducting ceramic bearing comprises electrically conducting ceramic bearing rolling elements comprising at least one of: a bearing ball, a roller, and a needle.

7. The x-ray tube of claim 6, wherein each electrically conducting bearing rolling element further comprises at least one of:
   (a) a conductive coating thereon; and
   (b) a non-conductive coating thereon.

8. An x-ray imaging system comprising:
   an x-ray tube for generating and directing x-rays toward a target along a focal spot alignment path, the x-ray tube comprising;
   a cathode operatively positioned within the x-ray tube to generate electrons;
   an anode assembly operatively positioned relative to the cathode to generate x-rays when struck by the electrons; and
   a bearing assembly capable of supporting rotation of the anode assembly relative to the cathode,
   wherein the bearing assembly comprises an electrically conducting ceramic bearing comprising TSC.

9. The x-ray imaging system of claim 8, wherein the electrically conducting ceramic bearing comprises electrically conducting ceramic bearing rolling elements comprising at least one of: a bearing ball, a roller, and a needle.

10. The x-ray imaging system of claim 9, wherein each electrically conducting bearing rolling element further comprises at least one of:
    (a) a conductive coating thereon; and
    (b) a non-conductive coating thereon.

* * * * *